Feb. 20, 1962   F. J. RODGERS   3,021,871
HOSE FOR PORTABLE PNEUMATIC EQUIPMENT
Filed May 14, 1958
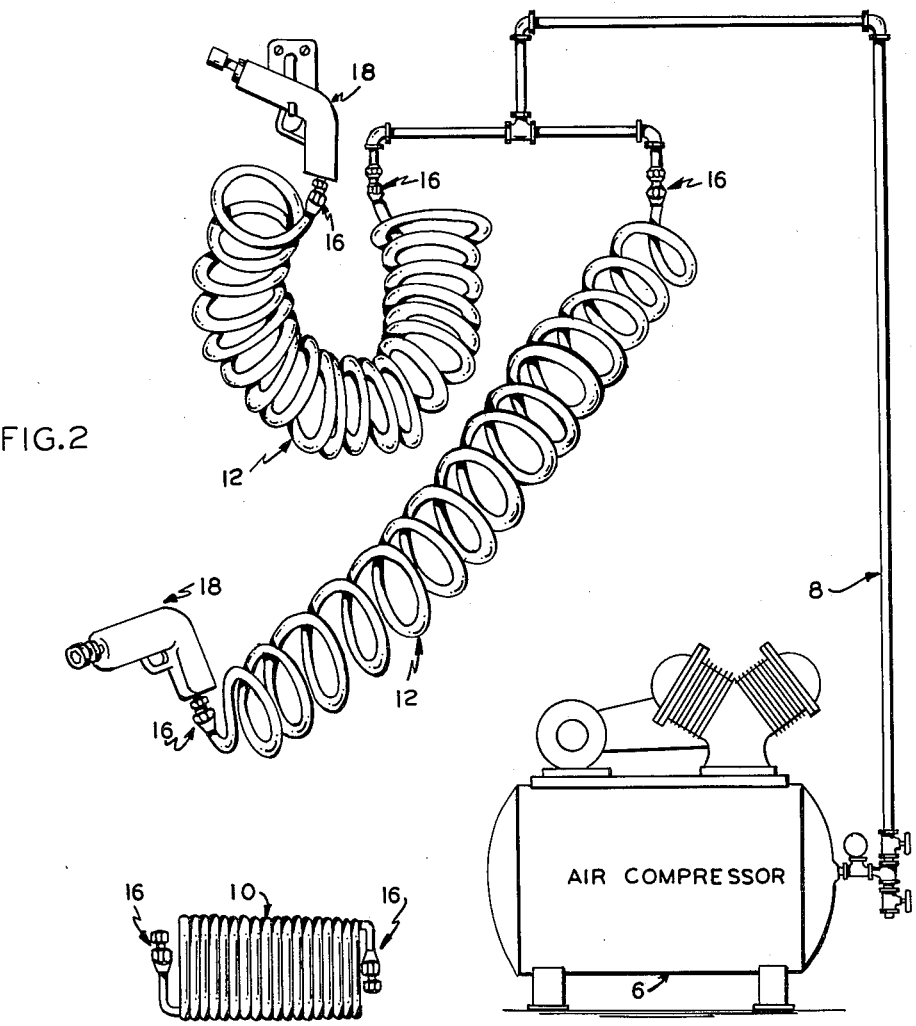
*INVENTOR.*
FRANK J. RODGERS
BY Richard W. Nagel
ATTORNEY

United States Patent Office 3,021,871
Patented Feb. 20, 1962

3,021,871
HOSE FOR PORTABLE PNEUMATIC
EQUIPMENT
Frank J. Rodgers, 545 Boulevard, Westfield, N.J.
Filed May 14, 1958, Ser. No. 735,268
3 Claims. (Cl. 138—118)

The present invention relates to a flexible thermoplastic coiled tube especially adapted to transmit fluids under high pressure to pneumatic equipment. More particularly, the present invention relates to an extruded thermoplastic tubing which has been given a treating operation adapted to impart to it flexible properties whereby a flexible coil is formed to which form it reverts after a displacing force has been removed.

At present, in machine shops and other establishments where portable equipment employing or actuated by fluids under high pressure is used, the fluid, i.e. compressed air, is normally transmitted through rubber hose of wall thickness adequate to withstand the pressures employed. Thus, pneumatic drills, compressed air hoses for blowing away metallic chips from drilling operations and the like, normally have air supplied through rubber hose. This provides sufficient flexibility and strength to the operation but it suffers from the disadvantage that rubber tubing will not recoil. This makes it particularly cumbersome to transport the tool from one location to another, inasmuch as the heavy lines may become tangled or be in the way when the tool is not in use. This usually requires additional devices and equipment such as reels or counterbalances to overcome the inconvenience. This extra equipment is not only expensive but also may not give consistent satisfaction in operation.

On the other hand, various devices have been provided for enabling tubing to maintain a coiled form. These are generally undesirable, particularly when applied to the exterior of hose, as they are objectionable and frequently break through continuous use of the hose.

It is therefore the principal object of the present invention to provide a novel coiled hose adapted to transmit fluids under high pressure to pneumatic tools. It is a still further object of the present invention to provide a coiled hose of this nature which has outstanding ability to withstand internal pressure and external abrasion. It is a still further object of the present invention to provide a coiled hose of the nature described which has the property of recoiling to its original shape or form even though subjected to tension along the axis of the coil. Other features and advantages of the invention will be seen from the following description taken in connection with the drawing.

FIGURE 1 is a view of the coiled hose at rest.
FIGURE 2 is an elevational view showing the coiled hose under tension joined through a standard pipe thread fitting to a pneumatic socket wrench.

A plastic that is suitable for the service above designated must be stiff, strong, tough, light, abrasive-resistant, have a low coefficient of friction, and be both chemically and thermally resistant. The synthetic plastic that is presently available most suited for this service is nylon. This is a member of a family of synthetic resins formed by condensation of dibasic acids such as terephthalic acids, with diamines to form linear chains containing amide linkages. The inherent properties of this synthetic in terms of strength, toughness, ability to withstand high temperature and pressures make it outstanding for this use. In general, the physical properties of a thermoplastic composition suitable for use in accordance with the present invention are as follows:

|  |  | ASTM Test |
|---|---|---|
| Specific Gravity | 1.09–1.41 | D792 |
| Specific Volume, cu. in./# | 25.5–22.2 | D792 |
| Refraction Index, $n_D$ | 1.53 | D542 |
| Tensile Strength, p.s.i. | 7,000–20,000 | D638, D651 |
| Elongation, Percent | 6.5–320 | D638 |
| Modulus of Elasticity in Tension, p.s.i. | $1.5$–$4.0 \times 10^5$ | D638 |
| Compressive Strength, p.s.i. | 6,700–13,000 | D695 |
| Flexural Strength, p.s.i. | 3,500–13,800 | D790 |
| Impact Strength Izod Test | 1.0–3.0 | D256 |
| Hardness Rockwell | R103–R118 | D783 |

Turning now to the drawing, there is shown the coil indicated generally by the numeral 10, comprising a plurality of helixes or loops 12 of substantially equal diameters terminating in standard pipe fittings 16.

The method of preparing the coil is advantageously as follows: The extruded hose or tube, which is preferably made of nylon, and which may have an outside diameter of from ⅛ inch to 1 inch, and a wall thickness of .010 inch to .400 inch, is first wrapped upon a mandrel of size sufficient to determine the desired diameter. It is preferred to wind the tube about the mandrel at room or ambient temperatures. It is one of the peculiarities of the preferred composition of the present invention that heating the tube prior to forming the coil on the mandrel tends to cause the tubular cross-section to assume an oval rather than a circular configuration. Cold forming, however, insures maintenance of the original circular structure. The plastic stock material is wound into the coil-shape form on a mandrel of such size that the inside diameter of the coil is determined by the diameter of the mandrel and the tension of the coil resilience being regulated by the size of this inside diameter and the proximity of the adjacent loops.

After the mandrel has been fully wrapped, steam is passed through the inside of the hose. The heated tubing thus conforms closely to the shape of the mandrel. Cold water is thereupon passed through the coil, simultaneously cooling and hardening the latter and substantially returning it to its original conditions. The coiled shape thus imparted to the tubing will be retained as long as the material is not subjected to softening temperatures. Air pressure or stretching of the hose will hereafter not permanently distort the coiled shape. In all probability, the recoil effect is provided by the inherent properties of the nylon plastic to return to its original shape or form once the deforming stress has been removed. This "elastic memory" is intimately related to the flexural strength and modulus of elasticity of the material.

The ends of the coil are provided with standard tube fittings, and may otherwise be machined in any desired manner. In a typical operation employing the flexible coil of the present invention, one end is connected to the source or outlet of the high pressure fluid stream, as fitting 16 in FIGURE 2. The other end is connected with pneumatic tool 18 and, because of its form, it is evident that portable tool 18 may be transferred and moved to any position without snarling or snagging the coil. On completion of its use, the tool may be returned to its original stand, coil 12 concomitantly resuming its rest position.

Though the coiled hose of the present invention has been described as being made, in one of its modifications, from nylon tubing, it is understood that other thermoplastic compositions have the necessary stiff or semirigid properties, as well as the characteristics hitherto cited, as well as sufficient "elastic memory," may be employed as well. Other existing plastics, however, such as polyvinyl chloride, polyethylene, polystyrene, and the like, are presently unsatisfactory. Vinyl and polystyrene, which are quite pliable, do not have sufficient stiffness to give the necessary resilience to the coiled shape. Styrene does not have sufficient elasticity and flexural strength to withstand the recoil effect required for an air hose. None of the three plastics mentioned have sufficient tensile strength to withstand the necessary high operating pressures of a hose using a practical wall thickness. The distortion temperature range of these three plastics is not high enough to make them practical materials.

What is claimed is:

1. A recoilable thermoplastic flexible hollow coiled tube adapted to transmit fluids under high pressure comprising a seamless resilient nylon tube having a substantially circular cross-section and in the form of a series of normally contacting, compact, adjacent convolutions and a wall-thickness sufficient to adapt it to withstand high internal pressures and to provide self-restoring ability.

2. The coil of claim 1 wherein said coil has a wall thickness of from .01 inch to .40 inch.

3. In combination with a fluid operated mechanism, a flexible hollow coiled tube adapted to transmit fluids under high pressure comprising a seamless resilient nylon tube having a substantially circular cross-section and in the form of a series of normally contacting, compact, adjacent, convolutions and a wall thickness sufficient to adapt it to withstand high internal pressures and to provide self-restoring ability.

References Cited in the file of this patent

UNITED STATES PATENTS

| | | |
|---|---|---|
| 1,832,811 | Jowett | Nov. 17, 1931 |
| 2,248,898 | Ross et al. | July 8, 1941 |
| 2,339,683 | Cox | Jan. 18, 1944 |
| 2,394,762 | Geraty | Feb. 12, 1946 |
| 2,612,140 | Miller | Sept. 30, 1952 |
| 2,619,125 | Eickmeyer et al. | Nov. 25, 1952 |
| 2,645,249 | Davis et al. | July 14, 1953 |
| 2,779,976 | Roberts et al. | Feb. 5, 1957 |
| 2,905,194 | Smith et al. | Sept. 22, 1959 |